A. D. MOSBY.
MACHINE FOR BENDING T-SECTION RAILS.
APPLICATION FILED FEB. 23, 1911.
1,040,382.
Patented Oct. 8, 1912.
6 SHEETS—SHEET 1.
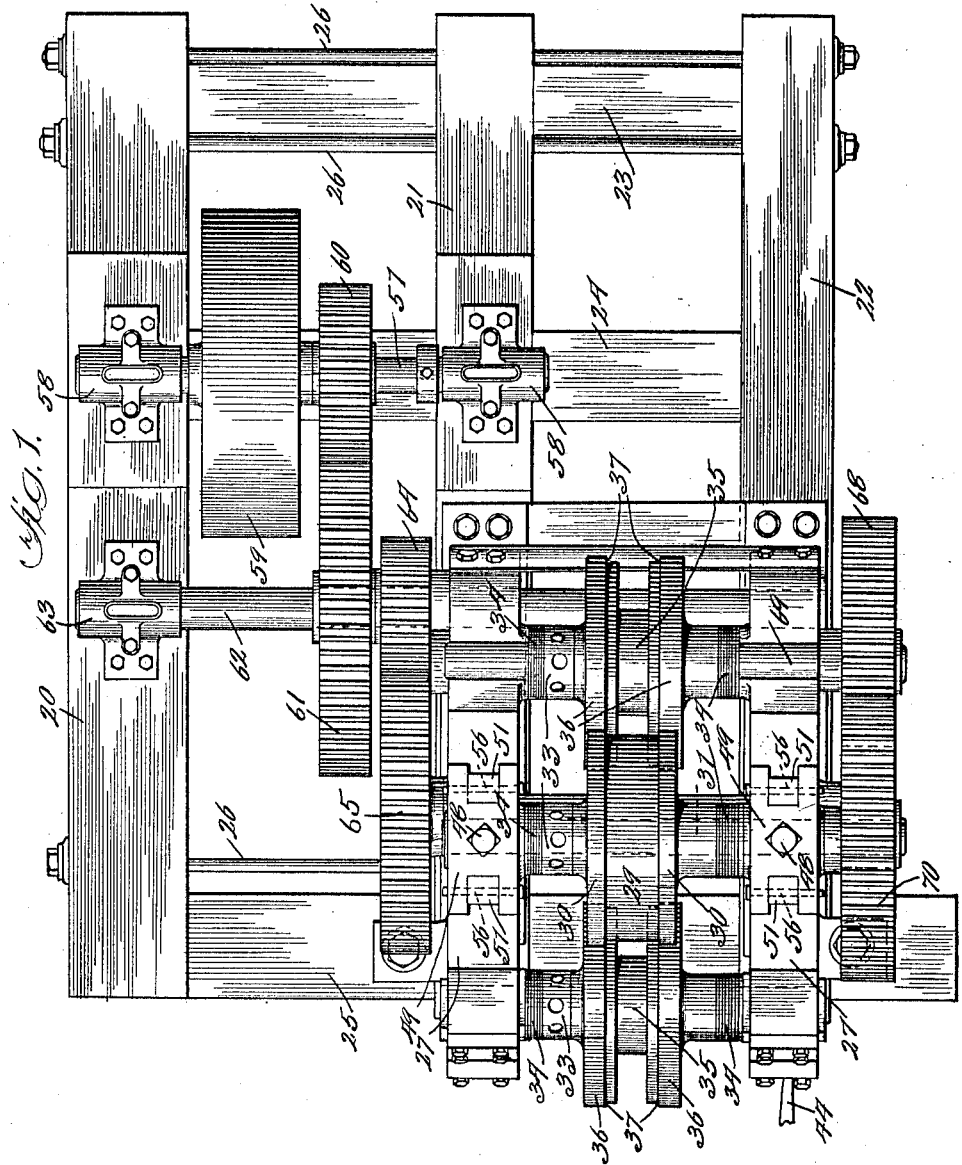

A. D. MOSBY.
MACHINE FOR BENDING T-SECTION RAILS.
APPLICATION FILED FEB. 23, 1911.
1,040,382.
Patented Oct. 8, 1912.
6 SHEETS—SHEET 2.
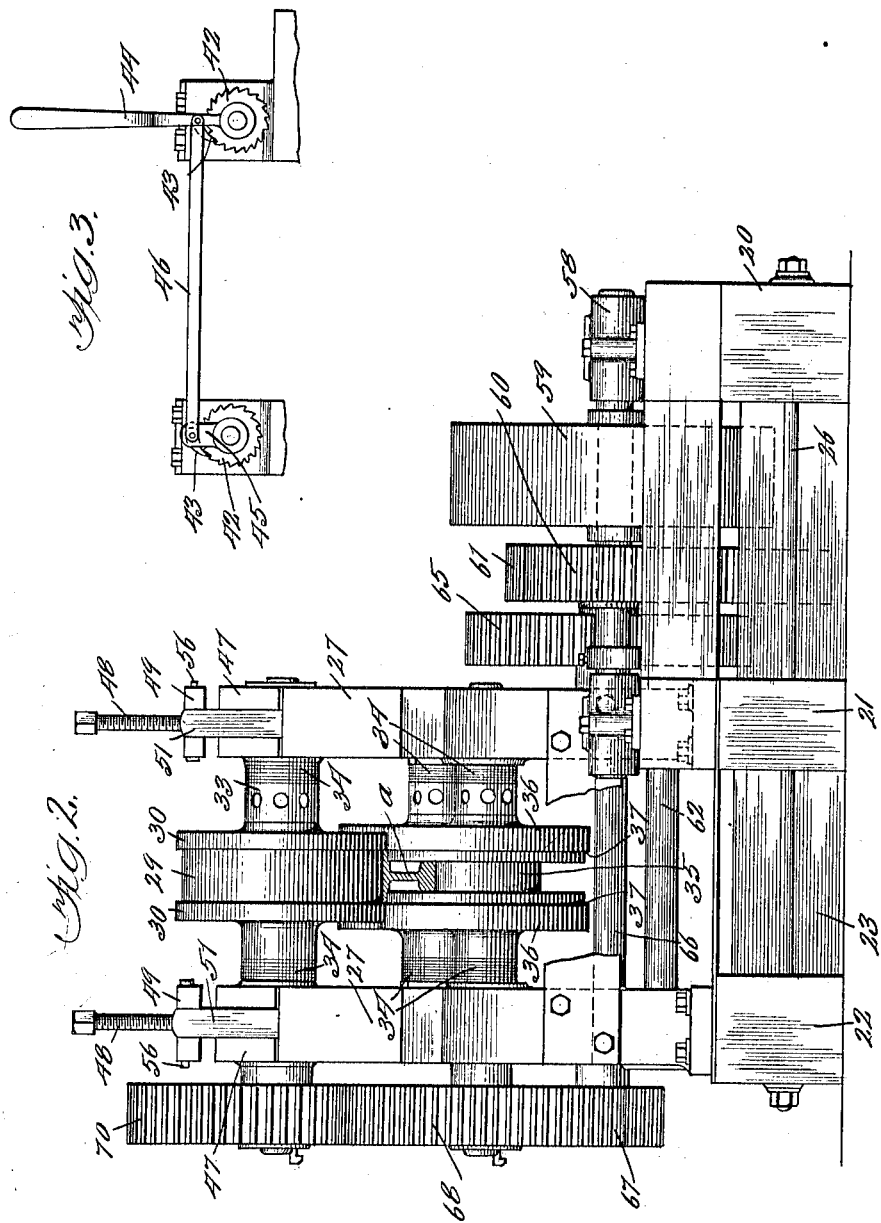

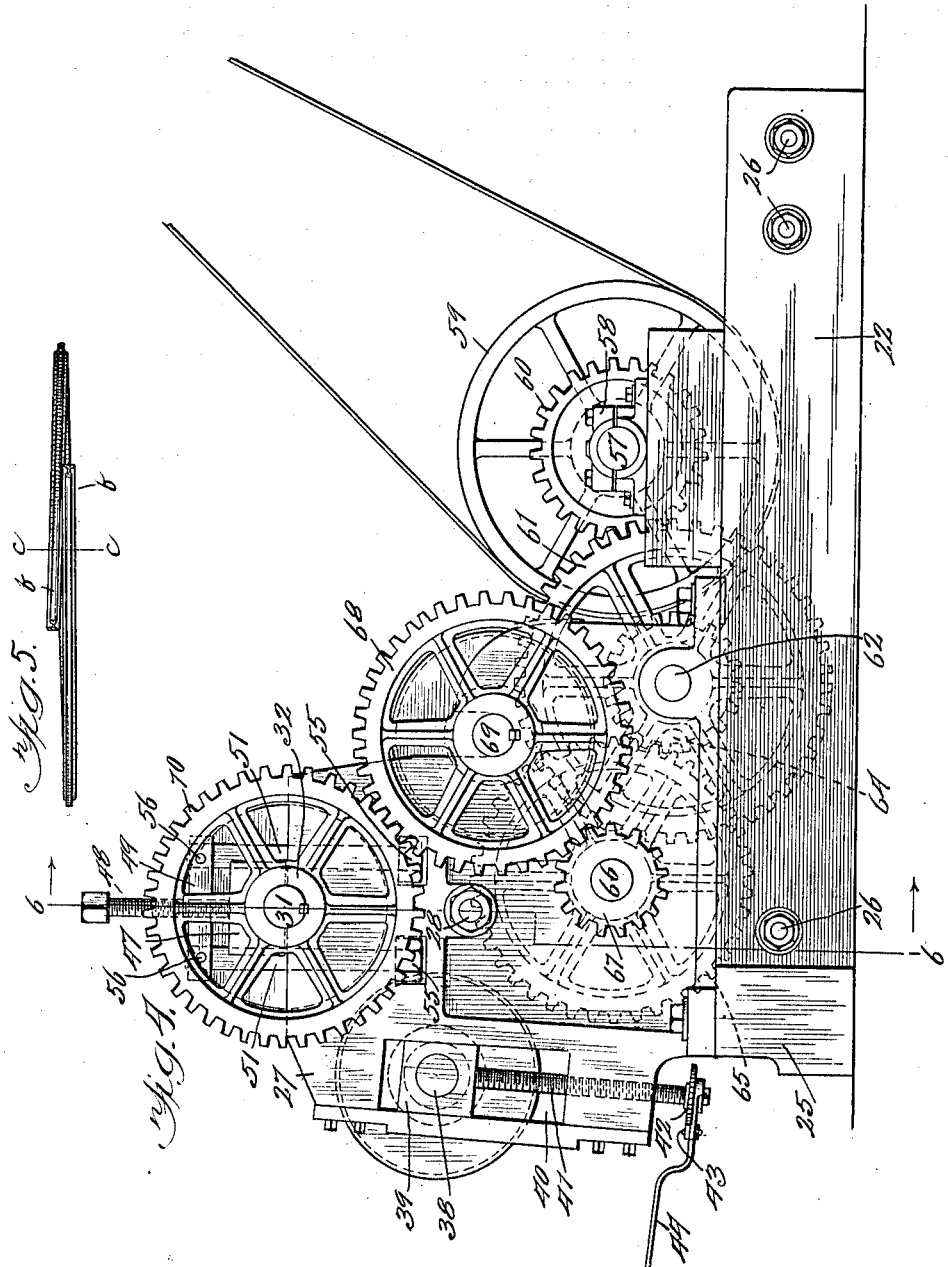

A. D. MOSBY.
MACHINE FOR BENDING T-SECTION RAILS.
APPLICATION FILED FEB. 23, 1911.
1,040,382.
Patented Oct. 8, 1912.
6 SHEETS—SHEET 4.
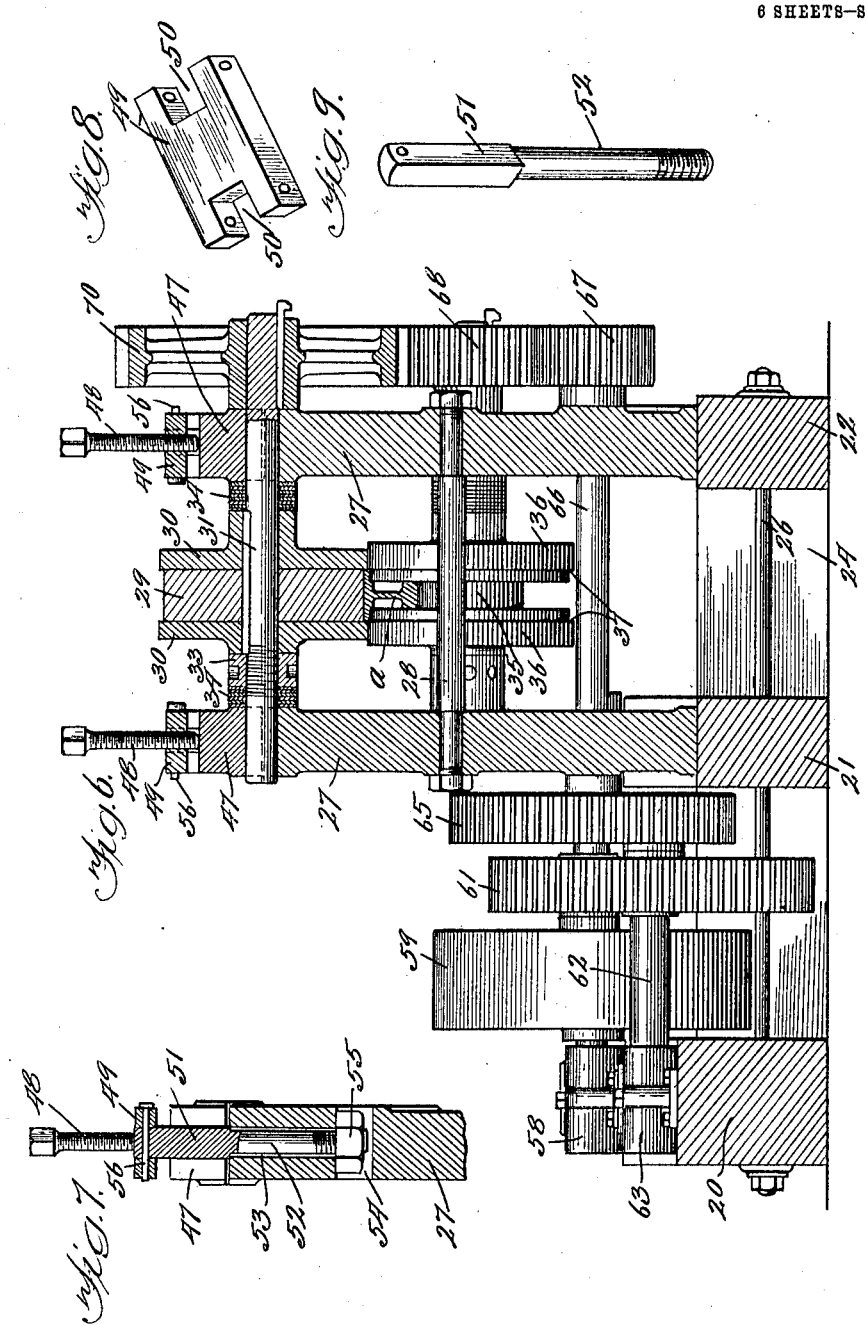

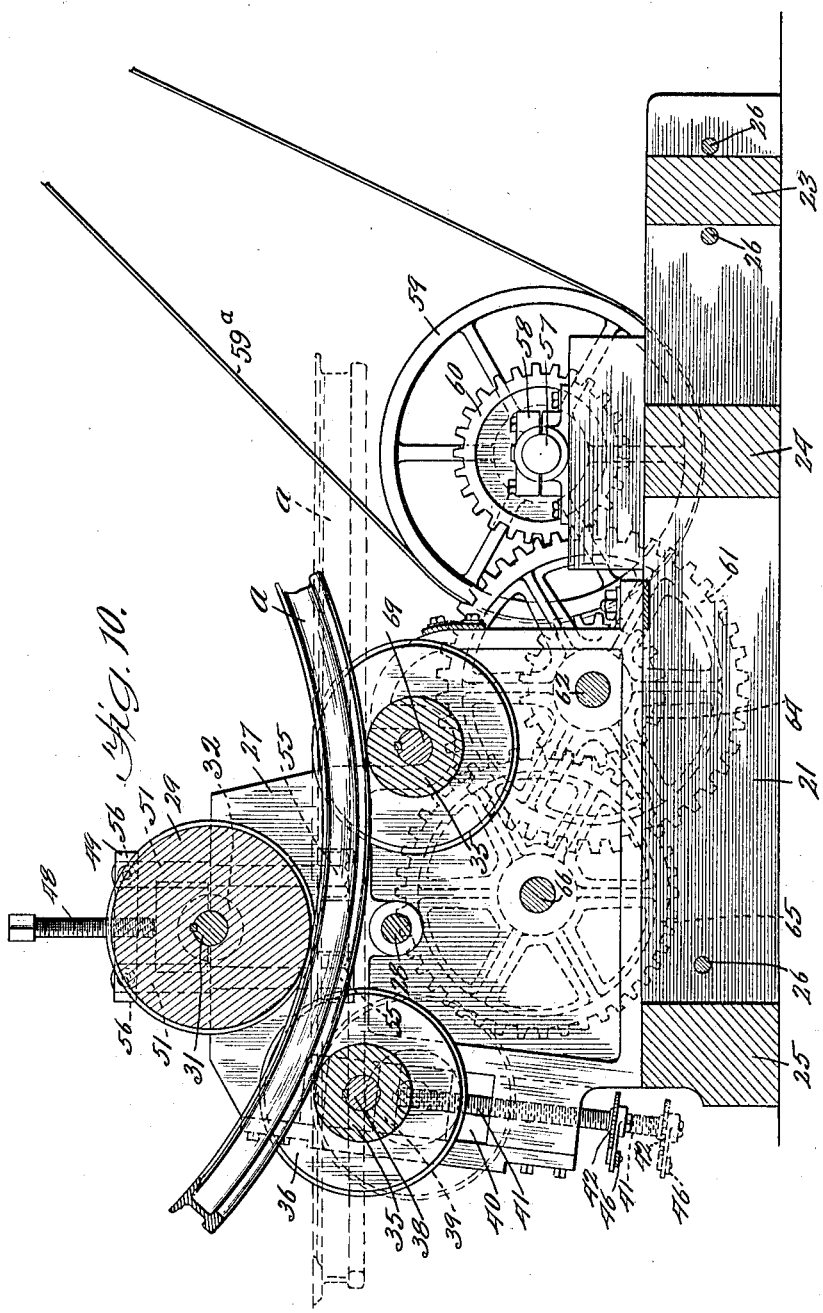

A. D. MOSBY.
MACHINE FOR BENDING T-SECTION RAILS.
APPLICATION FILED FEB. 23, 1911.
1,040,382.
Patented Oct. 8, 1912.
6 SHEETS—SHEET 6.
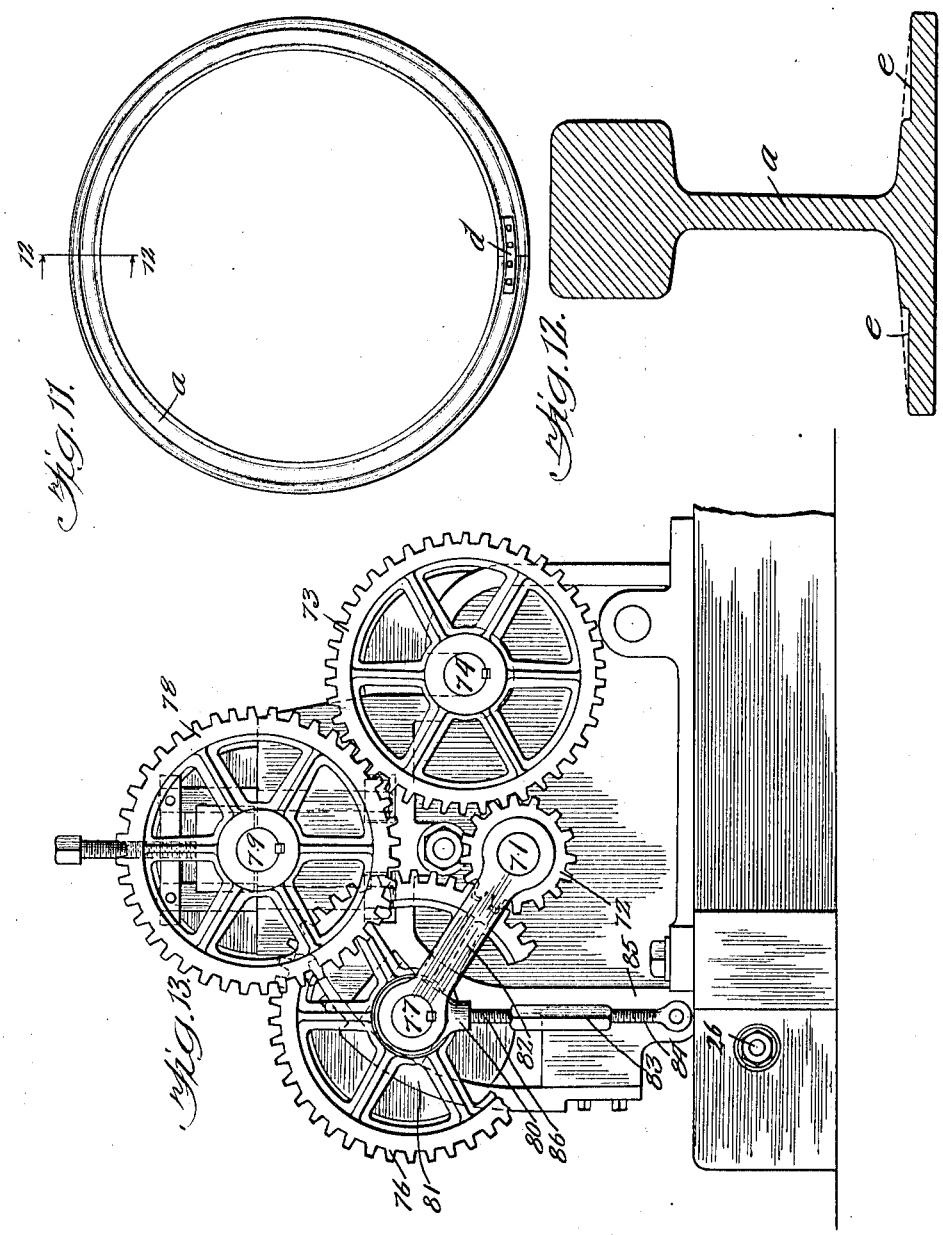

UNITED STATES PATENT OFFICE.

ALFRED D. MOSBY, OF CHICAGO, ILLINOIS, ASSIGNOR TO MARSH-CAPRON MANUFACTURING COMPANY, OF CHICAGO, ILLINOIS, A CORPORATION OF ILLINOIS.

MACHINE FOR BENDING T-SECTION RAILS.

1,040,382.  Specification of Letters Patent.  Patented Oct. 8, 1912.

Application filed February 23, 1911. Serial No. 610,153.

*To all whom it may concern:*

Be it known that I, ALFRED D. MOSBY, a citizen of the United States, residing at Chicago, in the county of Cook and State of Illinois, have invented certain new and useful Improvements in Machines for Bending T-Section Rails, of which the following is a specification.

My invention relates to bending T section railroad rails into circular form by a cold process; and the invention has for its object to provide a novel form of apparatus suitable for performing this operation.

A further subsidiary object of the invention is to provide an apparatus for carrying out the bending operation so that the base of the rail is flattened for the purpose to be hereinafter described.

The invention has for further objects to provide the centain novel and improved constructions, arrangements and devices in bending apparatus which will be hereinafter described and claimed.

The invention is illustrated, in a preferred embodiment, in the accompanying drawings, wherein—

Figure 1 is a plan view of the machine, Fig. 2, an end elevation looking at the machine from the left hand side of Fig. 1; Fig. 3, a fragmentary inverted plan view showing a preferred form of mechanism for shifting one of the forming rollers; Fig. 4, a side elevation of the machine; Fig. 5, a view of a piece of rail after being bent in the machine; Fig. 6, a vertical sectional view taken on line 6—6 of Fig. 4, looking in the direction of the arrows; Fig. 7, a fragmentary sectional view illustrating the preferred construction employed for removably mounting the upper roller; Figs. 8 and 9, views in perspective of parts used in this construction, Fig. 10, a longitudinal sectional view of the machine illustrating its mode of operation, Fig. 11, a side view of the finished ring, Fig. 12, a section, on an enlarged scale, taken on line 12—12 of Fig. 11, and Fig. 13, a side elevation of a form of machine in which the means for driving the rollers is modified.

Like characters of reference indicate like parts in the several figures of the drawings.

Referring to the drawings, the operative parts of the machine are shown as mounted upon a base consisting of the longitudinal members 20, 21, and 22, and transverse members 23, 24, 25 secured together by means of the tie rods 26; and upon the standards 27, 27 secured together by the tie rod 28.

The bending of the rail is accomplished by means of a lower pair of forming elements or rollers which bear against the sides of the ball of the rail and also against the surfaces of the base which are normally the upper surfaces, the rail being inverted when operated upon by the machine, and of an upper roller which bears upon the flat bottom surface of the rail base. The upper roller consists preferably of an annular member 29 substantially the width of the rail base and two annular members 30 having preferably a trifle larger diameter, all three members being keyed to a shaft 31 sustained in semi-circular bearings 32 formed in the standards 27. As shown, shaft 31 is screw threaded for a nut 33 and the spaces between the roller, constructed as above described, and the standards 27 are filled with the shims or spacers 34. The lower rollers may be constructed in a similar manner. As shown, they consist, in each case, of a central portion 35 and two side or flange forming portions 36, the latter being recessed so as to constitute shoulders 37 at each side of the base of the rail.

One of the three rollers is mounted so that its bearings may be gradually shifted transversely with respect to the rail. In the drawings I have shown the left hand lower roller (Figs. 1 and 4) so mounted. The shaft 38 of this roller turns in boxes 39 slidably mounted in guide ways 40 formed in the standards 27. Screws 41 bear against the under side of the boxes 39. Preferably mechanism is provided for turning up these screws simultaneously, for example, as shown particularly in Figs. 3 and 4. The screws 41 are furnished with ratchet wheels 42 engaged by pawls 43, one carried on a hand lever 44 and the other on a rock arm 45 connected to lever 44 by a link 46. Any other suitable means might be employed for turning up the screws.

Shaft 31 of the upper roller is preferably mounted on the machine so that the shaft and roller may be readily removed for the purpose of taking the rail out of the machine after it has been bent into the circular form. The shaft 31 is held down in the semi-circular bearings 32 by means of boxes 47, each of which is engaged by a screw 48 threaded through a block 49 formed with notches 50 to receive the squared ends 51 of bolts 52. The latter extend through perforations 53 in the standard 27 running to recesses 54 in which are located the nuts 55 on the ends of the bolts 52. The squared ends 51 of the bolts 52 are secured to the block 49 by the pins 56.

The machine is so constructed that the rail is forced back and forth through the rollers. Preferably this is done by driving some or all of the rolls. One form of drive is shown in Figs. 1, 2, 4, 6 and 10 in which arrangement the upper roller and one of the lower rollers are positively driven, the other roller being an idler. A shaft 57 mounted in suitable bearings 58 on the base members 20, 21, carries a belt pulley 59 driven by a belt 59ª and a gear wheel 60, the latter meshing with a gear wheel 61 on a shaft 62 turning in a bearing 63 on the base member 20 and taking bearing at the other end in the standards 27. Shaft 62 carries the gear wheel 64 which meshes with the gear 65, the latter being mounted on a shaft 66 carrying at its opposite end the gear wheel 67 which meshes with a gear 68 on the shaft 69 of the fixedly mounted lower roller. Gear wheel 68 meshes with a gear 70 on the shaft 31 of the upper roller. The direction of revolution of the driven rollers may be reversed by reversing the direction in which the belt is driven. Any suitable motor may be employed for driving the belt.

In Fig. 13 I have shown a modified arrangement of the driving apparatus by means of which the three rollers may be positively driven. 71 is a drive shaft carrying a pinion 72 which meshes with a gear 73 on the shaft 74 of one of the lower rollers. Pinion 72 also meshes with a gear 76 on the shaft 77 of the other one of the lower rollers. Gear 73 meshes with a gear 78 on the shaft 79 of the upper roller. The shaft 77 is carried in boxes 80 which are slidably mounted in curved guide ways 81 struck on an arc concentric with shaft 71. Links 82 connect shafts 71 and 77. Turn buckles 83, squared for a wrench, connect screws 84 pivoted to the frame members 85 and screws 86 on the boxes 80.

The operation of the machine above deis as follows: A straight piece of rail $a$ is placed between the rollers when the left hand lower roller, as shown in Fig. 10, is in the position indicated by the dotted lines. The ball of the rail fits in the central grooves in the lower rollers. The base of the rail rests in the recessed portions of the flange members 36 of the lower rollers between the shoulders 37. The central portion 29 of the upper roller bears against the bottom surface of the rail, the upper roller being formed with a slight shallow groove, as shown. By rotating the rollers first in one direction and then in the other, the rail is moved back and forth between them. By gradually raising the adjustable lower roller the rail will be bent on a curve and this operation can be continued until the rail assumes a circular form. As it would be difficult to obtain the proper curvature at the extreme ends of the rail a piece of rail is taken which is longer than the desired circumference and is bent so that its ends overlap, as shown in Fig. 5 at $b$ $b$. The bending operation concerned consists of a stretching of the ball and web of the rail and is made difficult by the fact that the ball of the rail is relatively heavy and large while the web and base are thin so that unless the rail is firmly held the web, and particularly the base, are likely to be distorted. It is not feasible to place the upper roller directly above one of the lower rollers as is frequently done in bending machines operating upon different sections from the one here concerned because the thickness of the base flanges of commercial rails of any given standard size is likely to vary as much as three thirty-seconds of an inch, which would mean that with such an arrangement, considering the relative thinness of said base flanges, would result in a looseness of the rail between the rollers which would be fatal to the operation. By arranging the upper roll between the other two, grooving the upper roll so that it fits over the base flanges, and by constructing the lower rolls with the deep groove for the ball and web and the recesses for the base, the latter is held from lateral movement and distortion due to the strains caused by the stretching of the ball at three points which are comparatively far apart. The holding the rail against any lateral movement is further necessitated by the fact that when the rail approaches its circular form its center of gravity is so far above the pass between the rolls as to make the handling of it unwieldly. It is necessary, of course, that during this part of the operation one end of the rail should pass to the side of one of the lower rolls at the end of each movement back and forth through the machine. This further increases the lateral strain but has the advantage of giving the rail the slightly spiral form necessary for the overlapping of the ends as described. When the bending operation is complete the rail is taken out of the machine by removing the upper roller and the overlapping ends are then sawed off, for example, on the line $c$, $c$, Fig. 5, and a splice made as indicated at $d$, Fig. 11. Generally both ends of the shaft 38 of the movable roller are raised simultaneously by the device shown in Fig. 3. In order to counteract the tendency of the rail to become distorted and bent unevenly it is frequently necessary to raise only one end of the roller shaft. This may be done by throwing the pawl 43 at the other end of the shaft out of contact with its ratchet. The slightly spiral curvature of the rail may be produced in the same manner if the bending due to causing the free ends to pass to the side of the lower rollers is not sufficient to produce this result.

While the pieces of rail so bent may be used for a variety of purposes the machine has been designed particularly for banding rails to be subsequently attached to the drum of a concrete mixer for the purpose of forming tracks for revolubly supporting the drum. In such case it is necessary to rivet or otherwise secure the rails to the drum. Difficulty has been experienced in doing this because of the inclination of the upper surfaces of the rail base. With the lower rolls of the machine constructed as shown, that is, with the recessed portions of the flange members 36 formed at right angles to the web of the rail, the base of the rail is flattened, during the bending operation, to the substantial shape indicated at e in Fig. 12. With the base of the rail so flattened the slipping of the drill is prevented. In order to obtain the flattening of the base flange it is obvious that the effective bearing of the rail on the lower rollers must be at the base flanges of the rail and not at the normally upper surface or tread of the ball of the rail. In order to get this essential disposition of the rail during the bending operation the grooves in the lower rolls may be made deep enough so that, initially at least, the ball of the rail does not touch the elements 35. However, even though the ball of the rail may touch, or nearly touch, the elements 35 at the start, the web and ball suffer a diminution in height during the bending and stretching process which is sufficient, in most cases, to keep the tread of the rail out of effective contact with the lower rollers. In other words, there appears to be a tendency on the part of the ball and web to shrink away from the elements 35 of the rollers which compensates for the fact that due to the swaging action the rail as a whole moves, and must necessarily move, downwardly in the lower rollers. The fact that there is no effective bearing between the ball of the rail and elements 35 of the rollers during the bending operation, that is, that the lower rollers exert no radial pressure against the ball of the rail, while holding the ball from lateral displacement, makes it possible to bend this difficult section without distortion. In this respect the swaging of the base flanges is incidental. After the rail has been bent into circular form it is necessary to remove the upper roll in order to remove the rail from the machine. This is done by simply unscrewing the nuts 55.

While I have described a preferred form of machine for performing the operation of bending the rails into the desired circular form, it will be obvious that there might be some modification made in the form, construction and arrangement of the parts shown without departure from my invention. Therefore I do not limit myself to the particulars herein shown and described except so far as certain of the same have been made limitations in certain of the claims herein. It will be clear also that while the machine is intended particularly for bending the rails into circular form, the bending operation need not be carried to that extent.

I claim:

1. In a machine for bending T section railroad rails into circular form, the combination of a pair of rollers having grooves to receive the ball of the rail and flanges which are recessed to receive the rail base, said rollers being formed so as to guide the ball of the rail laterally without exerting any effective radial pressure during the bending operation, a roller bearing on the bottom surface of the rail base between the points of contact of the first named pair of rollers and formed with a groove into which the rail base fits, the mechanism operating said roller being capable of reversal to pass the rail back and forth between the same, and means for shifting the bearings of one of said rollers in the direction against the rail, substantially as described.

2. In a machine for bending T section railroad rails into circular form, the combination of a pair of rollers having grooves to receive the ball of the rail and flanges which are recessed to receive the rail base, said rollers being formed so as to guide the ball of the rail laterally without exerting any effective radial pressure during the bending operation, a roller bearing on the bottom surface of the rail base between the points of contact of the first named pair of rollers and formed with a groove into which the rail base fits, the mechanism operating said rollers being capable of reversal to pass the rail back and forth between the same, and means for shifting the bearings of one of said rollers in the direction against the rail, the flanges of the first named pair of rollers being formed with cylindrical surfaces so that the bending operation flattens the upper surfaces of the rail base at the edges, substantially as described.

3. In a machine for bending T section railroad rails into circular form, the combination of a pair of rollers having grooves to receive the ball of the rail and flanges on which the rail base bears, said rollers being formed so as to guide the ball of the rail laterally without exerting any effective radial pressure during the bending operation, a roller bearing on the bottom surface of the rail base, means for guiding the rail base and holding the same from lateral displacement, the mechanism operating said rollers being capable of reversal to pass the rail back and forth between the same, and means for shifting the bearings of one of said rollers in the direction against the rail.

4. In a machine for bending T section railroad rails into circular form, the combination of a pair of rollers having grooves to receive the ball of the rail and cylindrical flanges on which the rail base bears, said rollers being formed so as to guide the ball of the rail laterally without exerting any effective radial pressure during the bending operation, a roller bearing on the bottom surface of the rail base, means for guiding the rail base and holding the same from lateral displacement, the mechanism operating said rollers being capable of reversal to pass the rail back and forth between the same, and means for shifting the bearings of one of said rollers in the direction against the rail.

5. In a machine for bending T section railroad rails into circular form, the combination with a frame, of a lower pair of rollers having grooves to receive the ball of the rail, and flanges which are recessed to receive the rail base, said rollers being formed so as to guide the ball of the rail laterally without exerting any effective radial pressure during the bending operation, an upper grooved roller which fits over and bears upon the rail base between the points of contact of the lower rollers, a shaft on which the upper roller is mounted, semi-circular bearings on the frame for said shaft, slidable boxes adapted to hold the shaft in said bearings, blocks having threaded perforations, set screws extending through said perforations and bearing against said boxes, bolts attached to said blocks and removably secured to the frame, the mechanism operating said rollers being capable of driving the upper roller and one of the lower rollers reversibly to pass the rail backward and forward through said rollers, and means for shifting the bearings of the other of said lower rollers in the direction against the rail, substantially as described.

ALFRED D. MOSBY.

Witnesses:
G. Y. SKINNER,
H. L. PECK.

---

Copies of this patent may be obtained for five cents each, by addressing the "Commissioner of Patents, Washington, D. C."